US008751805B2

(12) United States Patent
Zhao (10) Patent No.: US 8,751,805 B2
(45) Date of Patent: Jun. 10, 2014

(54) SERVICE PROVIDING CLIENT, WIRELESS TERMINAL AND METHOD FOR IMPLEMENTING BINDING

(75) Inventor: Xueliang Zhao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 15 days.

(21) Appl. No.: 13/258,409

(22) PCT Filed: May 19, 2010

(86) PCT No.: PCT/CN2010/072961
§ 371 (c)(1),
(2), (4) Date: Feb. 16, 2012

(87) PCT Pub. No.: WO2011/020350
PCT Pub. Date: Feb. 24, 2011

(65) Prior Publication Data
US 2012/0144194 A1 Jun. 7, 2012

(30) Foreign Application Priority Data

Aug. 19, 2009 (CN) .......................... 2009 1 0090515

(51) Int. Cl.
*H04W 12/06* (2009.01)
*H04L 9/32* (2006.01)
(52) U.S. Cl.
USPC ............... 713/168; 726/3; 711/163; 709/229; 709/230; 380/277; 380/286
(58) Field of Classification Search
USPC ....... 713/168, 155; 726/3; 711/163; 709/229; 709/230; 380/277, 286
See application file for complete search history.

(56) References Cited

U.S. PATENT DOCUMENTS

| 8,316,430 B2 * | 11/2012 | Mirza-Baig ..................... 726/13 |
| 2004/0049451 A1 | 3/2004 | Berardi |
| 2006/0172723 A1 * | 8/2006 | Ishikawa ....................... 455/411 |
| 2007/0265964 A1 | 11/2007 | Berardi et al. |
| 2009/0114724 A1 | 5/2009 | Isuyama |

FOREIGN PATENT DOCUMENTS

| CN | 1805335 A | 7/2006 |
| CN | 1956376 A | 5/2007 |
| CN | 1980451 A | 6/2007 |
| CN | 101247618 A | 8/2008 |

(Continued)

OTHER PUBLICATIONS

International Search Report in international application No. PCT/CN2010/072961, mailed on Sep. 2, 2010.

(Continued)

*Primary Examiner* — Kambiz Zand
*Assistant Examiner* — Sharif E Ullah
(74) *Attorney, Agent, or Firm* — Oppedahl Patent Law Firm LLC (57) ABSTRACT

The disclosure discloses a service providing client, a wireless terminal and a method for implementing binding. The service providing client comprises a transmission module, which is configured to transmit authentication information to the wireless terminal (701); a judgment module, which is configured to judge whether the wireless terminal is a legal binding object according to a response of the wireless terminal for the authentication information (702); and a processing module, which is configured to provide service to the wireless terminal (703) if the wireless terminal is a legal binding object, otherwise, restrict the service provided to the wireless terminal.

5 Claims, 8 Drawing Sheets (56) References Cited

FOREIGN PATENT DOCUMENTS

| | | |
|---|---|---|
| CN | 101316282 A | 12/2008 |
| CN | 101635920 A | 1/2010 |
| EP | 2009635 A1 | 12/2008 |
| GB | 2274960 A | 8/1994 |
| WO | 03007623 A2 | 1/2003 |

OTHER PUBLICATIONS

English Translation of the Written Opinion of the International Search Authority in international application No. PCT/CN2010/072961, mailed on Sep. 2, 2010.
Supplementary European Search Report in European application No. 10809483.0, mailed on Mar. 28, 2014, 8 total pages.

* cited by examiner

SERVICE PROVIDING CLIENT, WIRELESS TERMINAL AND METHOD FOR IMPLEMENTING BINDING

TECHNICAL FIELD

The disclosure relates to the field of communication technologies, and in particular to a service providing client, a wireless terminal and a method for implementing binding.

BACKGROUND

With the rapid development of computer technologies and communication technologies, the combination of computer technologies and communication technologies is widely applied to every aspect of people's life, for example, a service providing client can be used on a Personal Computer (PC) to cooperate to work with a wireless terminal (e.g., a data card, a cell phone and so on) to realize services such as surfing a net, making a call and so on, so as to bring great convenience to users. With the promotion of $3^{rd}$ Generation (3G) service in China, a wireless communication network service using a wireless terminal in next years certainly will, like Euramerican developed countries, replace a fixed network service with a slow speed and complicated installation and maintenance at present; therefore, the usage of the wireless terminal and service providing client has a great development space.

The present wireless terminal and service providing client can be bound randomly and can cooperate to work; for example, a wireless terminal customized by an operator A can bind and cooperate to work with a service providing client customized by an operator B; in order to attract customers, more and more operators provide subsidies in a variety of forms when selling the customized service providing client and wireless terminal; therefore, an operator does not expect a user to use a wireless terminal or a service providing client customized by other operators after the user buys a customized product; at present, there is no effective solution which can restrict the binding between service providing client and wireless terminal.

SUMMARY

In view of above problems, the disclosure provides a service providing client, a wireless terminal and a method for implementing binding, which can restrict the binding between service providing client and wireless terminal.

In order to realize the object above, the technical scheme of the disclosure is realized as follows.

A service providing client comprises:
a transmission module, which is configured to transmit authentication information to a wireless terminal;
a judgment module, which is configured to judge whether the wireless terminal is a legal binding object according to a response of the wireless terminal for the authentication information; and
a processing module, which is configured to provide service to the wireless terminal if the wireless terminal is a legal binding object, and restrict the service provided to the wireless terminal if the wireless terminal is an illegal binding object.

The client may further comprise:
a random number generation module, which is configured to generate a random number as the authentication information; and a first encryption module, which is configured to encrypt the random number by using a first encryption algorithm to obtain encryption information;
wherein the judgment module may comprise:
a first authentication unit, which is configured to judge whether response information of the wireless terminal for the random number is received;
a second authentication unit, which is configured to judge whether the response information is consistent with the encryption information if the response information is received; and
a determination unit, which is configured to determine that the wireless terminal is a legal binding object if the response information is consistent with the encryption information, and determine that the wireless terminal is an illegal binding object if the response information is inconsistent with the encryption information or the wireless terminal does not respond.

The client may further comprise:
a second encryption module, which is configured to encrypt authentication information by using a second encryption algorithm to obtain response information if the authentication information transmitted by the wireless terminal is received; and
a feedback module, which is configured to transmit the response information to the wireless terminal.

A wireless terminal comprises:
a transmission module, which is configured to transmit authentication information to a service providing client;
a judgment module, which is configured to judge whether the service providing client is legal according to a response of the service providing client for the authentication information; and
a processing module, which is configured to provide service to the service providing client if the service providing client is legal, and provide no service if the service providing client is illegal.

The terminal may further comprise:
a random number generation module, which is configured to generate a random number as the authentication information; and
a first encryption module, which is configured to encrypt the random number by using a second encryption algorithm to obtain encryption information;
wherein the judgment module may comprise:
a first authentication unit, which is configured to judge whether response information of the service providing client for the random number is received;
a second authentication unit, which is configured to judge whether the response information is consistent with the encryption information if the response information is received; and
a determination unit, which is configured to determine that the service providing client is legal if the response information is consistent with the encryption information, and determine that the service providing client is illegal or the service providing client does not run if the response information is inconsistent with the encryption information or the response of the service providing client is not received.

The wireless terminal may further comprise:
a timer, which is configured to start timing when being powered on and started;
wherein the transmission module may be further configured to transmit the random number to the service providing client at a predefined time interval according to the timing of the timer;

the judgment module may be further configured to determine that the service providing client is legal if response information of the service providing client for the random number is received within a predefined time and the response information is consistent with the encryption information, and determine that the service providing client is illegal or the service providing client does not run if the response information is received within the predefined time and the response information is inconsistent with the encryption information or the response of the service providing client is not received within the predefined time.

The terminal may further comprise:

a second encryption module, which is configured to encrypt authentication information by using a first encryption algorithm to obtain response information if authentication information transmitted by the service providing client is received; and a feedback module, which is configured to transmit the response information to the service providing client.

A method for implementing binding between a service providing client and a wireless terminal, comprises:

a service providing client transmits authentication information to a wireless terminal;

the service providing client judges whether the wireless terminal is a legal binding object according to a response of the wireless terminal for the authentication information; and the service providing client provides service to the wireless terminal if the wireless terminal is a legal binding object, and restricts the service provided to the wireless terminal if the wireless terminal is an illegal binding object.

The method may further comprise: before a service providing client transmits authentication information to a wireless terminal, the service providing client generates a random number as the authentication information; and the service providing client encrypts the random number by using a first encryption algorithm to obtain encryption information.

The service providing client judges whether the wireless terminal is a legal binding object according to a response of the wireless terminal for the authentication information may specifically comprise:

judging, by the service providing client, whether response information of the wireless terminal for the random number is received;

judging whether the response information is consistent with the encryption information if the service providing client receives the response information; and determining, by the service providing client, that the wireless terminal is a legal binding object if the response information is consistent with the encryption information, and determining that the wireless terminal is an illegal binding object if the response information is inconsistent with the encryption information or the wireless terminal does not respond.

The method may further comprise:

the service providing client encrypts authentication information by using a second encryption algorithm to obtain response information if the authentication information transmitted by the wireless terminal is received; and the service providing client transmits the response information to the wireless terminal.

A method for implementing binding between a service providing client and a wireless terminal, comprises:

a wireless terminal transmits authentication information to a service providing client;

the wireless terminal judges whether the service providing client is legal according to a response of the service providing client for the authentication information;

the wireless terminal provides service to the service providing client if the service providing client is legal, and provides no service if the service providing client is illegal.

The method may further comprise: before a wireless terminal transmits authentication information to a service providing client, the wireless terminal generates a random number as the authentication information; and the wireless terminal encrypts the random number by using a second encryption algorithm to obtain encryption information.

The wireless terminal judges whether the service providing client is legal according to a response of the service providing client for the authentication information may specifically comprise:

the wireless terminal judges whether response information of the service providing client for the random number is received;

the wireless terminal judges whether the response information is consistent with the encryption information if the response information is received; and the wireless terminal determines that the service providing client is legal if the response information is consistent with the encryption information, and determines that the service providing client is illegal or the service providing client does not run if the response information is inconsistent with the encryption information or the response of the service providing client is not received.

The disclosure has advantages as follows: through an interactive authentication between a service providing client and a wireless terminal, it is judged whether the service providing client and the wireless terminal are legal; the service providing client only provides service to the legal wireless terminal which passes the authentication, similarly, the wireless terminal only provides service to the legal service providing client which passes the authentication; therefore, an operator can bind a customized wireless terminal with a customized service providing client to prevent a user who buys a product of the operator from using a product of other operators, thereby maintaining benefits of the operator and avoiding the chaotic condition in the prior art that any wireless terminals and service providing clients can be bound randomly.

DETAILED DESCRIPTION

The specific implementation of the disclosure is further illustrated below in detail in conjunction with accompanying drawings and embodiments.

Figure 1:
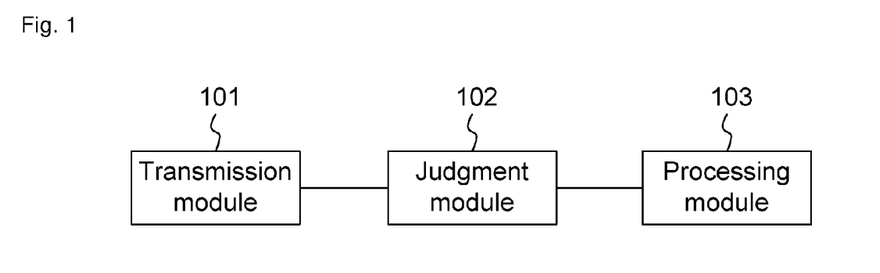
FIG. 1 shows a structure diagram of a service providing client according to an embodiment of the disclosure.

FIG. 1 shows a structure diagram of a service providing client according to an embodiment of the disclosure; the service providing client runs on a computing device which may be a device such as a PC or a Personal Digital Assistant (PDA) and the like; the service providing client can store a phone book with large capacity, a communication mailbox and a call log, and can bind and cooperate to work with a legal wireless terminal to realize communication functions such as surfing a net and making a call and the like; the so called legal wireless terminal is: a wireless terminal which passes an authentication of the service providing client, wherein the wireless terminal may be a communication device such as a data card and a cell phone and the like.

The service providing client comprises:

a transmission module 101, which is configured to transmit authentication information to a wireless terminal, wherein the wireless terminal is a wireless terminal connected with the service providing client; the wireless terminal can be connected with a computing device on which the service providing client is located through a wired or wireless interface, and can be connected with the service providing client to communicate through a specified communication channel (such as an AT port); the authentication information transmitted from the service providing client to the wireless terminal can be: a number, a letter or a character string consisting of number and letter;

a judgment module 102, which is configured to judge whether the wireless terminal is a legal binding object according to a response from the wireless terminal for the authentication information; and a processing module 103, which is configured to provide service to the wireless terminal if the wireless terminal is a legal binding object, otherwise, restrict the service provided to the wireless terminal; that is, the service providing client only provides service to a legal wireless terminal which passes the authentication; the way of restricting the service provided to the wireless terminal is implemented by the following ways specifically: the service providing client shuts down automatically, or the service providing client shuts down some functions, wherein the specific condition depends on the setting of an operator.

Figure 2:
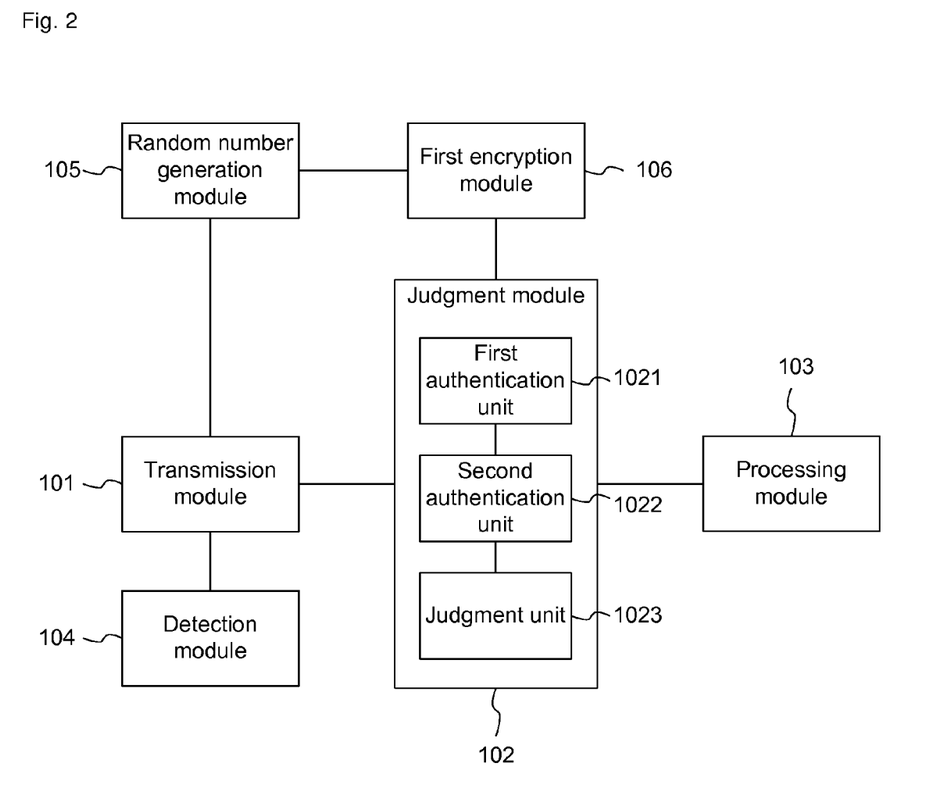
FIG. 2 shows a second structure diagram of a service providing client according to an embodiment of the disclosure.

In the embodiment above, the service providing client may comprise a detection module, which is configured to detect whether there is a wireless terminal running, wherein the wireless terminal is a wireless terminal connected with a computing device on which the service providing client is located; when it is detected that there is a wireless terminal running, authenticating whether the wireless terminal is legal; therefore, FIG. 2 shows a second structure diagram of a service providing client according to an embodiment of the disclosure; on the basis of the embodiment as shown in FIG. 1, the service providing client further comprises:

a detection module 104, which is configured to detect whether there is a wireless terminal running;

the transmission module 101 is further configured to transmit the authentication information to the wireless terminal when it is detected that there is a wireless terminal running.

When it is detected that there is a wireless terminal running, it is necessary for the service providing client to establish a communication channel with the wireless terminal; after the communication channel is established, the service providing client transmits authentication information to the wireless terminal and waits for a response from the wireless terminal for the authentication information; before the wireless terminal responds, a user cannot execute any operation for the service providing client; after the wireless terminal feeds back correct response information, the service providing client binding with the wireless terminal, then the user can execute operation to the service providing client so as to realize communication functions such as surfing a net and making a call and the like.

In order to prevent the authentication information transmitted to the wireless terminal from being cracked easily, the service providing client can generate a random number as authentication information; therefore, as shown in FIG. 2, the service providing client further comprises:

a random number generation module 105, which is configured to generate a random number as the authentication information; in order to increase cracking difficulty, it should be guaranteed that the random number generated each time is different and has relatively more digits, such as a random number with more than 8 digits; the length of the random number can be set by an operator; the transmission module 101 is further configured to transmit the random number generated by the random number generation module 105 to the wireless terminal.

Besides, a legal wireless terminal can be set as follows: when receiving the random number, encrypts the random number by using a given encryption algorithm and obtains response information; meanwhile, the service providing client needs to apply the same encryption algorithm to encrypt the random number and obtains encryption information; since the service providing client and the legal wireless terminal apply the same encryption algorithm to encrypt the random number, the encryption information obtained after the service providing client encrypts the random number is consistent with the response information obtained after the legal wireless terminal encrypts the random number; since the illegal wireless terminal does not know the given encryption algorithm and the key, the illegal wireless terminal cannot obtain correct response information or even feeds back no information to the service providing client; therefore, the service providing client can judge whether the wireless terminal is a legal binding object according to the response from the wireless terminal for the random number.

As shown in FIG. 2, the service providing client further comprises:

a first encryption module 106, which is configured to encrypt the random number by using a first encryption algorithm to obtain encryption information; the first encryption module 106 can adopt an encryption algorithm which is difficult to crack as the first encryption algorithm, for example, a Rivest-Shamir-Adleman (RSA) encryption algorithm, a Message-Digest algorithm 5 (MD5) and the like; the encryption algorithm can be selected by an operator.

At this moment, the judgment module 102 comprises:

a first authentication unit 1021, which is configured to judge whether response information from the wireless terminal for the random number is received;

a second authentication unit 1022, which is configured to judge whether the response information is consistent with the encryption information if the response information is received; and a determination unit 1023, which is configured to determine that the wireless terminal is a legal binding object if the response information is consistent with the encryption information, and determine that the wireless terminal is an illegal binding object if the response information is inconsistent with the encryption information or the wireless terminal does not respond.

Usually, the wireless terminal has a function of judging whether an SIM card inserted into it is legal, that is, the wireless terminal only provides service to a legal SIM card; when receiving authentication information, if the SIM card inserted is legal, the legal wireless terminal encrypts the received authentication information to obtain correct response information and feeds back the response information to the service providing client; if the SIM card inserted is illegal, the wireless terminal feeds back an error result to the service providing client.

After receiving response information from the wireless terminal, the service providing client compares the response information with encryption information obtained by encrypting the random number; if the response information is consistent with the encryption information, it is considered that the wireless terminal is a legal binding object, that is, both the wireless terminal and the SIM card are legal, then provides service to the wireless terminal; if the response information is inconsistent with the encryption information, it is considered that the wireless terminal is an illegal binding object, at this moment, the condition probably is that the wireless terminal is illegal or the wireless terminal is legal but the SIM card is illegal, then the service providing client restricts the service provided to the wireless terminal.

Besides, the wireless terminal connected with the service providing client probably transmits authentication information to the service providing client to authenticate whether the service providing client is legal; when receiving the authentication information transmitted by the wireless terminal, the service providing client can encrypt the authentication information by using a given encryption algorithm and then transmits the encrypted response information to the wireless terminal, so that the wireless terminal can authenticate whether the service providing client is legal through the response information.

Figure 3:
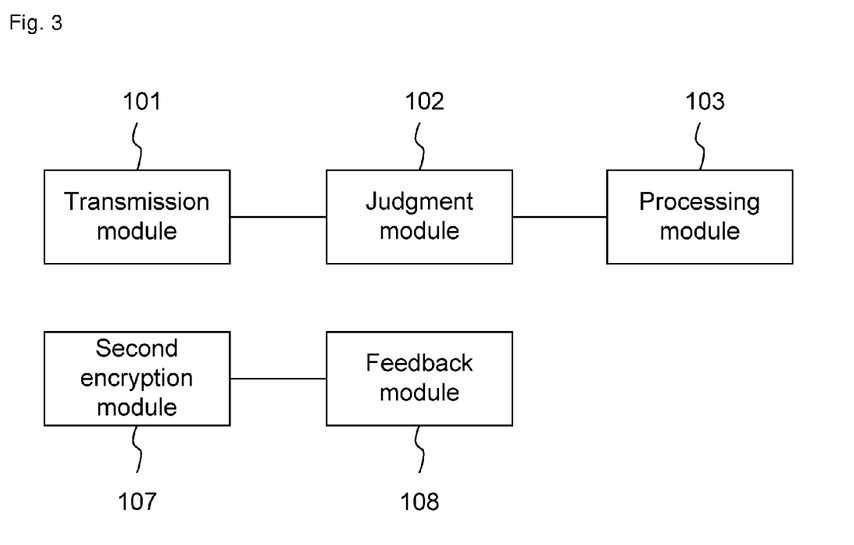
FIG. 3 shows a third structure diagram of a service providing client according to an embodiment of the disclosure.

FIG. 3 shows a third structure diagram of a service providing client according to an embodiment of the disclosure; on the basis of the embodiment as shown in FIG. 1, the service providing client further comprises:

a second encryption module 107, which is configured to encrypt authentication information by using a second encryption algorithm to obtain response information if the authentication information transmitted by the wireless terminal is received; wherein the second encryption algorithm can be the same as or different from the first encryption algorithm referred in the embodiment above; usually, in order to increase the cracking difficulty, the selected first encryption algorithm is different from the second encryption algorithm; and a feedback module 108, which is configured to transmit the response information to the wireless terminal.

The service providing client referred in the embodiment above can judge whether the wireless terminal connected with the service providing client is a legal binding object in form of transmitting authentication information, so as to determine whether to provide service to the wireless terminal.

Of course, the wireless terminal also can judge whether the service providing client, running on a computing device and connected with the wireless terminal, is legal, so as to determine whether to provide service to the service providing client.

Figure 4:
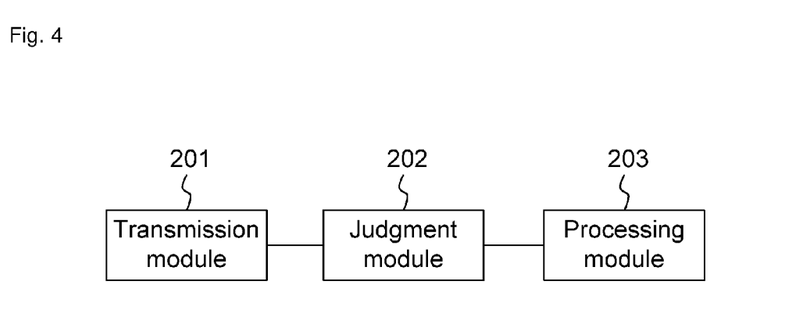
FIG. 4 shows a structure diagram of a wireless terminal according to an embodiment of the disclosure.

FIG. 4 shows a structure diagram of a wireless terminal according to an embodiment of the disclosure; the wireless terminal can be a communication device such as a data card and a cell phone and the like, and can bind and cooperate to work with a legal service providing client running on a computing device connected with the wireless terminal so as to realize communication functions such as surfing a net and making a call and the like; the so called legal service providing client is: a service providing client which passes the authentication of the wireless terminal.

The wireless terminal comprises:

a transmission module 201, which is configured to transmit authentication information to a service providing client, wherein the authentication information transmitted from the wireless terminal to the service providing client can be: a number, a letter or a character string consisting of number and letter and the like;

a judgment module 202, which is configured to judge whether the service providing client is legal according to the response of the service providing client for the authentication information; and a processing module 203, which is configured to provide service to the service providing client if the service providing client is legal, otherwise, provide no service; that is, the wireless terminal only provides service to a legal service providing client which passes the authentication; the process of providing no service is implemented by the following ways specifically: the wireless terminal powers off or does no respond.

Figure 5:
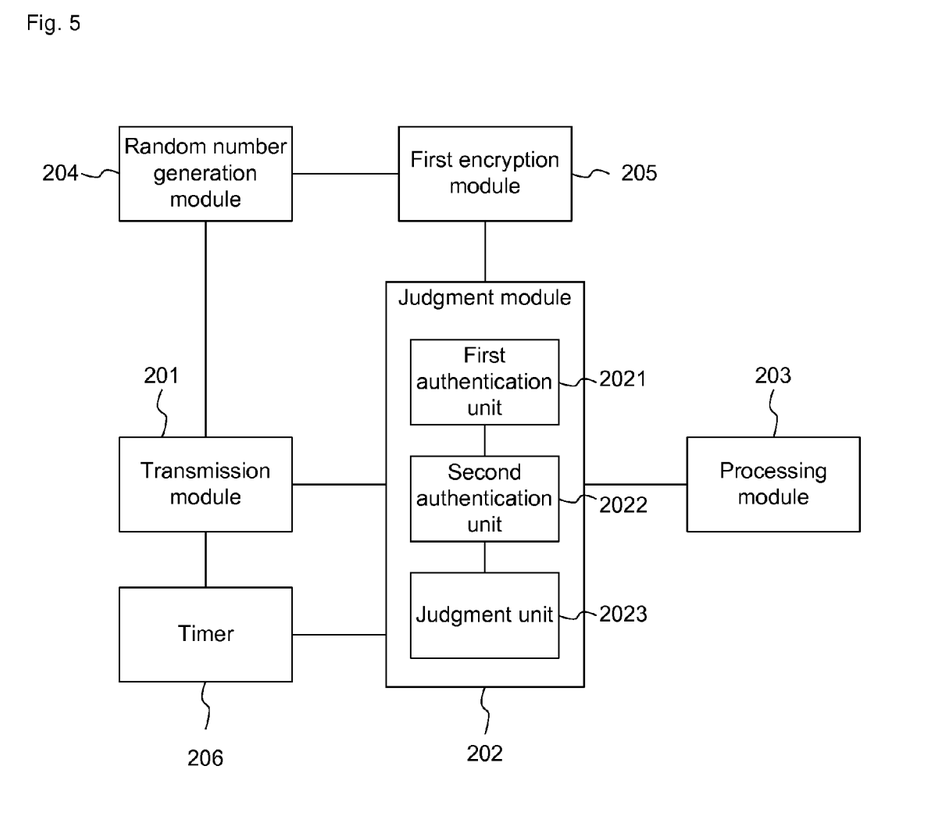
FIG. 5 shows a second structure diagram of a wireless terminal according to an embodiment of the disclosure.

In order to prevent the authentication information transmitted to the service providing client from being cracked easily, the wireless terminal can generate a random number as authentication information; FIG. 5 shows a second structure diagram of a wireless terminal according to an embodiment of the disclosure; on the basis of the embodiment as shown in FIG. 4, the wireless terminal further comprises:

a random number generation module 204, which is configured to generate a random number as the authentication information; in order to increase cracking difficulty, it should be guaranteed that the random number generated each time is different and has relatively more digits, such as a random number with more than 8 digits.

Besides, a legal service providing client can be set as follows: when receiving the random number, encrypts the random number by using a given encryption algorithm to obtain response information; meanwhile, the wireless terminal needs to apply the same encryption algorithm to encrypt the random number to obtain encryption information; since the wireless terminal and the legal service providing client apply the same encryption algorithm to encrypt the random number, therefore the encryption information obtained after the wireless terminal encrypts the random number is consistent with the response information obtained after the legal service providing client encrypts the random number; since the illegal service providing client does not know the given encryption algorithm and the key, the illegal service providing client cannot obtain correct response information or even feeds back no information to the wireless terminal; therefore, the wireless terminal can judge whether the service providing client is legal according to the response of the service providing client for the random number.

As shown in FIG. 5, the wireless terminal further comprises:

a first encryption module 205, which is configured to encrypt the random number by using a second encryption algorithm to obtain encryption information.

The judgment module 202 comprises:

a first authentication unit 2021, which is configured to judge whether response information of the service providing client for the random number is received;

a second authentication unit 2022, which is configured to judge whether the response information is consistent with the encryption information if the response information is received; and a determination unit 2023, which is configured to determine that the service providing client is legal if the response information is consistent with the encryption information, and determine that the service providing client is illegal or the service providing client does not run if the response information is inconsistent with the encryption information or the response from the service providing client is not received.

The wireless terminal referred in the embodiment above can transmit authentication information to the service providing client when being powered on and started, if the service providing client is legal, it can feed back correct response information to the wireless terminal; if the service providing client is illegal, it probably feeds back error response information to wireless terminal or feeds back no information to the wireless terminal; besides, if no service providing client runs, the wireless terminal cannot receive a response from the service providing client; therefore, the wireless terminal can judge whether the service providing client is legal according to a response of the service providing client.

Besides, since the wireless terminal might not detect when the illegal service providing client run, thus the wireless terminal can start a timer when being powered on and started, and transmit an authentication message to the service providing client at a certain time interval; therefore, even though it cannot be detected when the illegal service providing client run, only if no feedback or error feedback is received within a given time interval, it can be judged that the service providing client running at that moment is illegal.

However, when the wireless terminal transmits authentication information, a legal service providing client might be in an initialization stage (that is, the service providing client is in a starting process and not in a normal operation state), since the service providing client cannot receive the authentication information in the initialization sate, thus the service providing client, even if legal, also cannot feed back correct response information to the wireless terminal; in order to solve the problem above, the wireless terminal can, when detecting that a legal service providing client is started, reset the timer mentioned above to begin retiming and transmit an authentication message to the service providing client at a given time interval; therefore, even though the legal service providing client cannot receive an authentication message in the initialization stage, after the initialization is ended, the legal service providing client also can receive the authentication information transmitted again by the wireless terminal.

As shown in FIG. 5, the wireless terminal further comprises:

a timer 206, which is configured to start timing when being powered on and started.

The transmission module 201 is further configured to transmit the random number to the service providing client at a predefined time interval according to the timing of the timer 206;

the judgment module 202 is further configured to determine that the service providing client is legal if response information of the service providing client for the random number is received within a predefined time and the response information is consistent with the encryption information, and determine that the service providing client is illegal or the service providing client does not run if the response information is received within the predefined time and the response information is inconsistent with the encryption information or the response of the service providing client is not received within the predefined time.

Besides, the service providing client connected with the wireless terminal probably transmits authentication information to the wireless terminal to authenticate whether the wireless terminal is legal; when receiving the authentication information transmitted by the service providing client, the wireless terminal can encrypt the authentication information by using a given encryption algorithm and then transmits the encrypted response information to the service providing client, so that the service providing client can authenticate whether the wireless terminal is legal through the response information.

Figure 6:
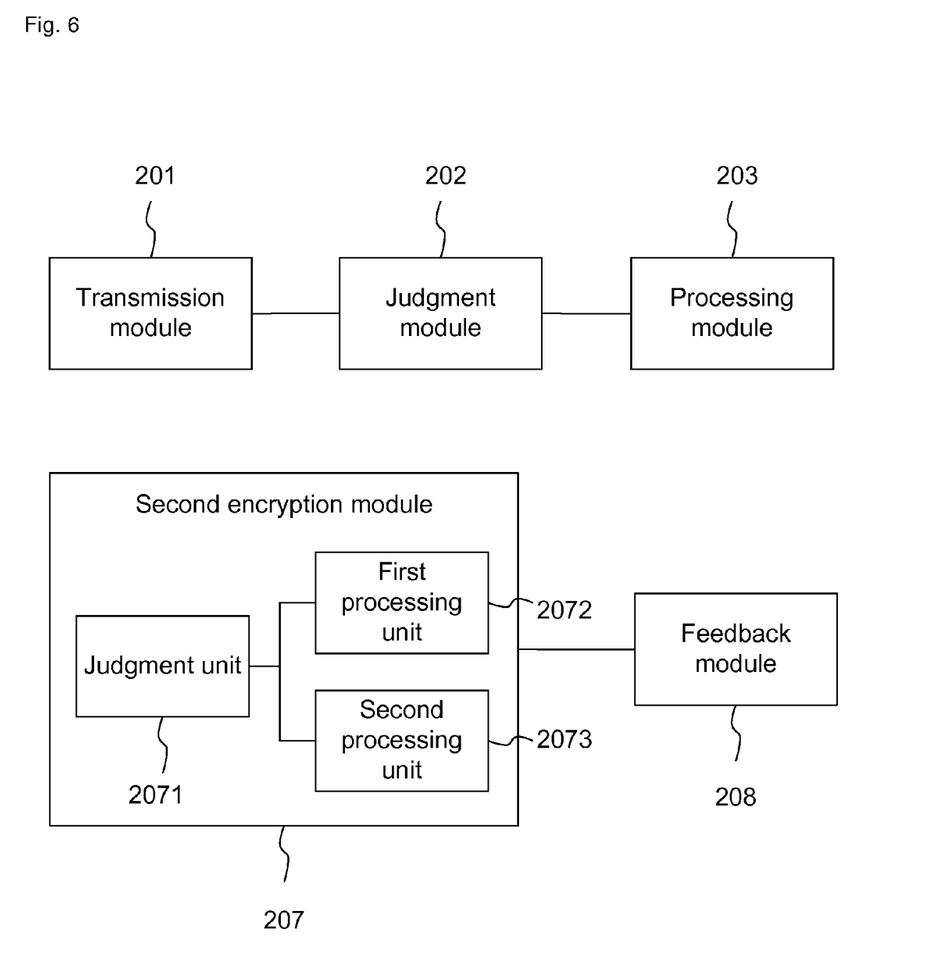
FIG. 6 shows a third structure diagram of a wireless terminal according to an embodiment of the disclosure.

FIG. 6 shows a third structure diagram of a wireless terminal according to an embodiment of the disclosure; on the basis of the embodiment as shown in FIG. 4, the wireless terminal further comprises:

a second encryption module 207, which is configured to encrypt authentication information by using a first encryption algorithm to obtain response information if the authentication information transmitted by the service providing client is received; and a feedback module 208, which is configured to transmit the response information to the service providing client.

In order to further guarantee the benefit of an operator, usually, the wireless terminal customized by an operator can judge whether an SIM card inserted into it is legal, that is, only the SIM card customized by the operator can use the customized wireless terminal; therefore, when receiving authentication information transmitted by the service providing client, the wireless terminal also needs to authenticate whether the SIM card inserted is a legal SIM card, if the SIM card is legal, encrypts the authentication information by using a given encryption algorithm and transmits the encrypted response information to the service providing client which transmits the authentication information; otherwise, the wireless terminal feeds back an error result to the service providing client or directly feeds back no information.

As shown in FIG. 6, the second encryption module 207 comprises:

a judgment unit 2071, which is configured to judge whether an SIM card inserted is legal if authentication information transmitted by the service providing client is received;

a first processing unit 2072, which is configured to apply the first encryption algorithm to encrypt the authentication information to obtain response information if the SIM card is legal; and a second processing unit 2073, which is configured to feed back an error result to the service providing client or not feed back if the SIM card is illegal.

In the embodiment above, through an interactive authentication between a service providing client and a wireless terminal, it is judged whether the service providing client or the wireless terminal is legal; the service providing client only provides service to the legal wireless terminal which passes the authentication, similarly, the wireless terminal only provides service to the legal service providing client which passes the authentication; therefore, an operator can bind a customized wireless terminal and a customized service providing client to prevent the user who buys a product of the operator from using a product of other operators, thereby maintaining benefits of the operator and avoiding the chaotic condition in the prior art that any wireless terminals and service providing clients can be bound randomly.

An embodiment of the disclosure further provides a system for implementing binding between a service providing client and a wireless terminal, comprises a service providing client and a wireless terminal, wherein the wireless terminal comprises:

a first transmission module, which is configured to transmit authentication information to the service providing client;

a first judgment module, which is configured to judge whether the service providing client is legal according to the response of the service providing client for the authentication information;

a first processing module, which is configured to provide service to the service providing client if the service providing client is legal, otherwise, provide no service;

the service providing client comprises:

a second transmission module, which is configured to transmit authentication information to the wireless terminal;

a second judgment module, which is configured to judge whether the wireless terminal is a legal binding object according to a response of the wireless terminal for the authentication information;

a processing module, which is configured to provide service to the wireless terminal if the wireless terminal is a legal binding object, otherwise, restrict the service provided to the wireless terminal.

The service providing client has the same structure as that of the service providing client mentioned in the embodiment above; and the wireless terminal has the same structure as that of the wireless terminal mentioned in the embodiment above, no further description is illustrated here.

In the embodiment above, the communication between the service providing client and the wireless terminal can be implemented by a message, wherein AT can be adopted as the carrier of the message; the defined AT instruction can be "instruction, instruction parameter 1", for example, "Lock, 23484275".

In the embodiment above, if the legal service providing client in an initialization stage and cannot receive authentication information when the wireless terminal transmits authentication information, then the wireless terminal probably executes power-off execution since it cannot receive correct response information; when the legal service providing client can run normally after finishing the initialization, since the wireless terminal probably has powered off, the wireless terminal cannot be used.

In order to solve the problem above, the service providing client also can comprise an indication module, which is configured to transmit a restart instruction to the wireless terminal after the initialization stage is ended; wherein the purpose of transmitting a restart instruction is to avoid the occurrence that illegal service providing clients continuously transmit retiming instructions to the wireless terminal and that the wireless terminal cannot be normally used sequentially.

At this moment, the wireless terminal also comprises a restart module, which is configured to restart powering when the restart instruction transmitted by the service providing client is received; after the wireless terminal is restarted and repowered on, the timer starts to time again; after the wireless terminal is restarted, the transmission module transmits the random number to the service providing client according to the timing of the timer.

Figure 7:
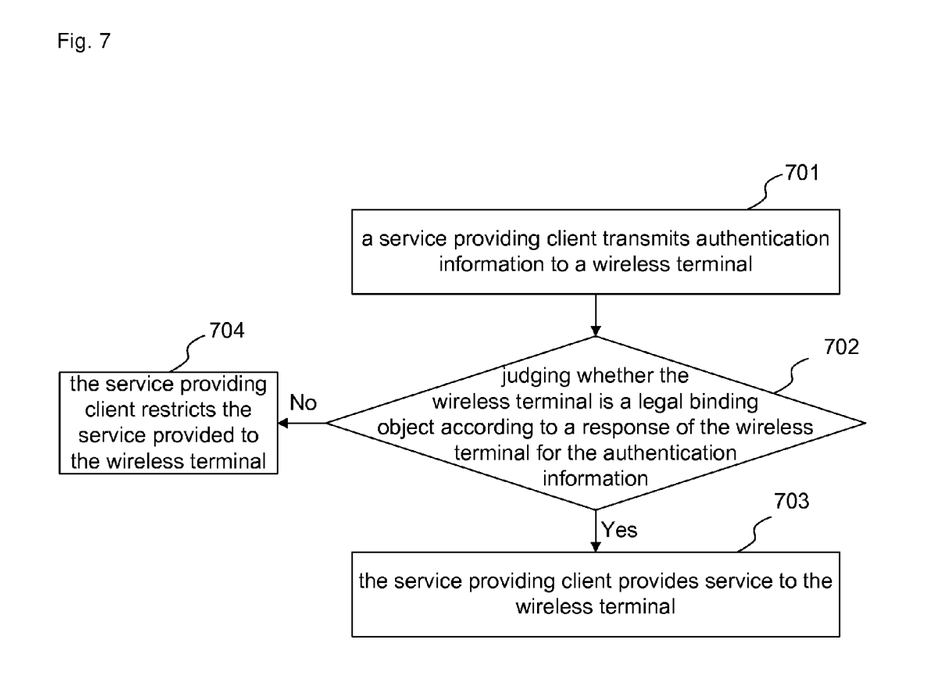
FIG. 7 shows a flowchart of a method for implementing binding between a service providing client and a wireless client according to an embodiment of the disclosure.

FIG. 7 shows a flowchart of a method for implementing binding between a service providing client and a wireless client according to an embodiment of the disclosure; and the method for implementing binding between a service providing client and a wireless client comprises the following steps.

Step 701: a service providing client transmits authentication information to a wireless terminal; wherein the wireless terminal is a wireless terminal connected with the service providing client; the service providing client is capable of running on a computing device which can be a device such as a PC or a PDA and the like; the service providing client can store information such as a phone book with large capacity, a communication mailbox and a call log and the like, and can bind and cooperate to work with a legal wireless terminal to realize communication functions such as surfing a net and making a call and the like; the so called legal wireless terminal is: a wireless terminal which passes the authentication of the service providing client and can be a communication device such as a data card and a cell phone and the like.

Step 702: the service providing client judges whether the wireless terminal is a legal binding object according to a response of the wireless terminal for the authentication information; if the wireless terminal is a legal binding object, step 703 is to be executed; otherwise, step 704 is to be executed.

Step 703: the service providing client provides service to the wireless terminal.

Step 704: the service providing client restricts the service provided to the wireless terminal; the process of restricting the service provided to the wireless terminal is implemented by the following ways specifically: the service providing client shuts down automatically, or the service providing client shuts down some functions, wherein the specific condition depends on the setting of an operator.

A legal wireless terminal can be set as follows: when receiving a random number as authentication information, encrypts the random number by using a given encryption algorithm to obtain response information; meanwhile, the service providing client needs to apply the same encryption algorithm to encrypt the random number to obtain encryption information; since the service providing client and the legal wireless terminal apply the same encryption algorithm to encrypt the random number, the encryption information obtained after the service providing client encrypts the random number is consistent with the response information obtained after the legal wireless terminal encrypts the random number; since the illegal wireless terminal does not know the given encryption algorithm and the key, the illegal wireless terminal cannot obtain correct response information or even feeds back no information to the service providing client; therefore, the service providing client can judge whether the wireless terminal is a legal binding object according to the response of the wireless terminal for the random number.

Figure 8:
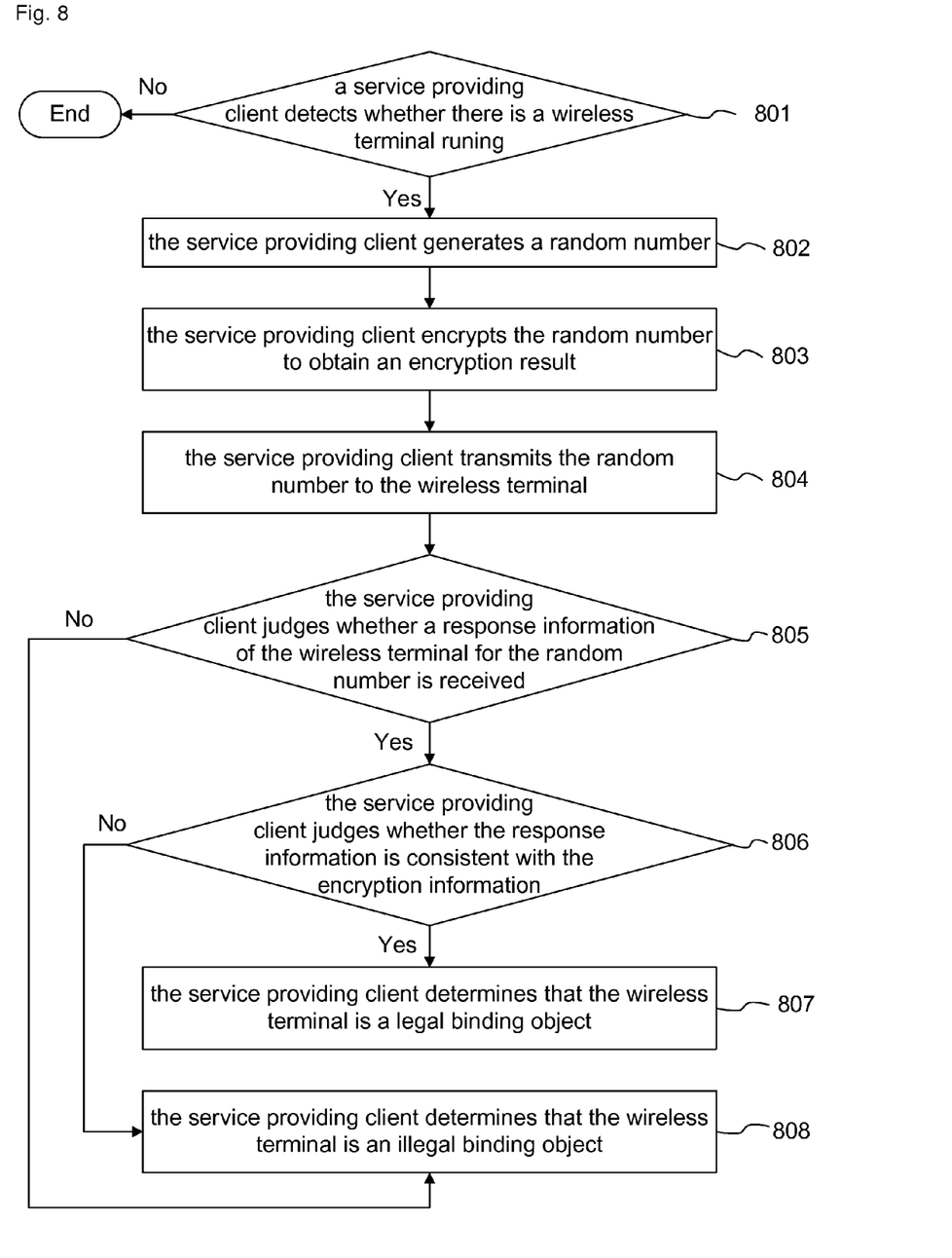
FIG. 8 shows a second flowchart of a method for implementing binding between a service providing client and a wireless client according to an embodiment of the disclosure.

FIG. 8 shows a second flowchart of a method for implementing binding between a service providing client and a wireless client according to an embodiment of the disclosure; and the method for implementing binding between a service providing client and a wireless client comprises the following steps.

Step 801: a service providing client detects whether there is a wireless terminal running, if yes, step 802 is to be executed; otherwise, the process is ended.

Step 802: the service providing client generates a random number as authentication information; in order to prevent the authentication information transmitted to the wireless terminal from being cracked easily, the service providing client can generate a random number as the authentication information; besides, in order to increase cracking difficulty, it should be guaranteed that the random number generated each time is different and has relatively more digits, such as a random number with more than 8 digits; the length of the random number can be set by an operator.

Step 803: the service providing client encrypts the random number by using a first encryption algorithm to obtain encryption information.

Step 804: the service providing client transmits the random number to the wireless terminal; step 803 and step 804 above only represent that encryption and transmission are executed and do not represent the execution order.

Step 805: the service providing client judges whether response information of the wireless terminal for the random number is received; if the response information is received, step 806 is to be executed; otherwise, step 808 is to be executed.

Step 806: the service providing client judges whether the response information is consistent with the encryption information; if yes, step 807 is to be executed; otherwise, step 808 is to be executed.

Step 807: the service providing client determines that the wireless terminal is a legal binding object.

Step 808: the service providing client determines that the wireless terminal is an illegal binding object.

Besides, the wireless terminal connected with the service providing client probably transmits authentication information to the service providing client to authenticate whether the service providing client is legal; when receiving the authentication information transmitted by the wireless terminal, the service providing client can encrypt the authentication information by using a given encryption algorithm and then transmits the encrypted response information to the wireless terminal, so that the wireless terminal can authenticate whether the service providing client is legal through the response information.

Therefore, the method for implementing binding between a service providing client and a wireless terminal may further comprise: the step, when receiving authentication information transmitted by the wireless terminal, the service providing client encrypts the authentication information by using a second encryption algorithm to obtain response information; and the step the service providing client transmits the response information to the wireless terminal.

The service providing client referred in the embodiment above can judge whether the wireless terminal connected with the service providing client is a legal binding object in form of transmitting authentication information, so as to determine whether to provide service to the wireless terminal.

Of course, the wireless terminal can also judge whether the service providing client running on a client connected with the wireless terminal is legal in form of transmitting authentication information, so as to determine whether to provide service to the service providing client.

Figure 9:
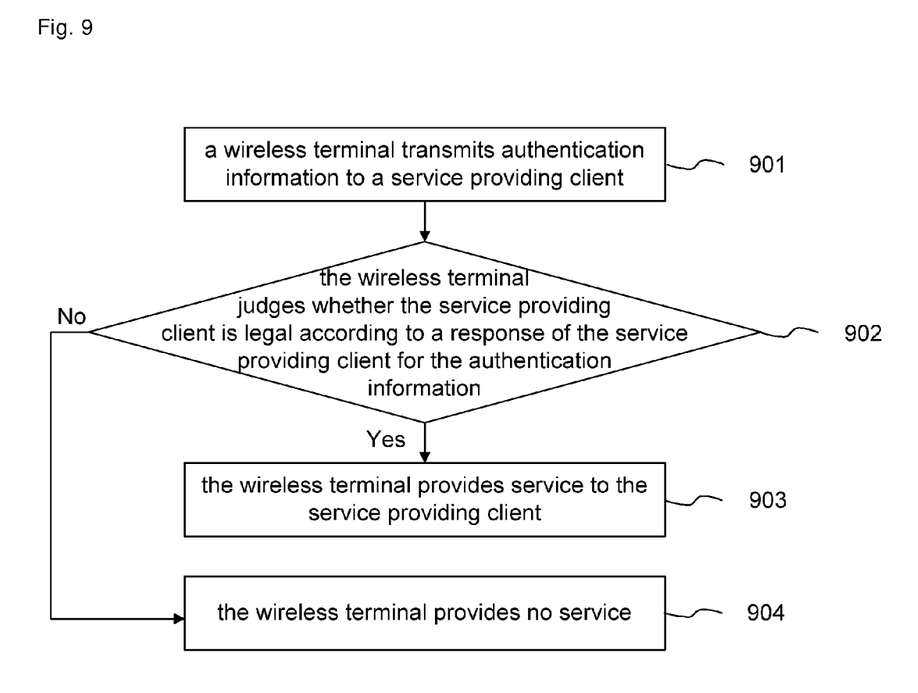
FIG. 9 shows a third flowchart of a method for implementing binding between a service providing client and a wireless client according to an embodiment of the disclosure.

FIG. 9 shows a third flowchart of a method for implementing binding between a service providing client and a wireless client according to an embodiment of the disclosure; and the method for implementing binding between a service providing client and a wireless client comprises the following steps.

Step 901: a wireless terminal transmits authentication information to a service providing client, wherein the wireless terminal may be a communication device such as a data card and a cell phone and the like, and can bind and cooperate to work with a legal service providing client to realize communication functions such as surfing a net and making a call and the like; the so called legal service providing client is: a service providing client which passes the authentication of the wireless terminal; the authentication information transmitted by the wireless terminal to the service providing client can be: a number, a letter or a character string consisting of number and letter and the like.

Step 902: the wireless terminal judges whether the service providing client is legal according to a response of the service providing client for the authentication information; if yes, step 903 is to be executed; otherwise, step 904 is to be executed.

Step 903: the wireless terminal provides service to the service providing client.

Step 904: the wireless terminal provides no service; the process of providing no service is implemented by the following ways specifically: the wireless terminal powers off or does no respond and the like.

Besides, a legal service providing client can be set as follows: when receiving a random number as authentication information, encrypts the random number by using a given encryption algorithm to obtain response information; meanwhile, the wireless terminal needs to apply the same encryption algorithm to encrypt the random number to obtain encryption information; since the wireless terminal and the legal service providing client apply the same encryption algorithm to encrypt the random number, therefore the encryption information obtained after the wireless terminal encrypts the random number is consistent with the response information obtained after the legal service providing client encrypts the random number; since the illegal service providing client does not know the given encryption algorithm and the key, the illegal service providing client cannot obtain correct response information or even feeds back no information to the wireless terminal; therefore, the wireless terminal can judge whether the service providing client is legal according to the response of the service providing client for the random number.

Figure 10:
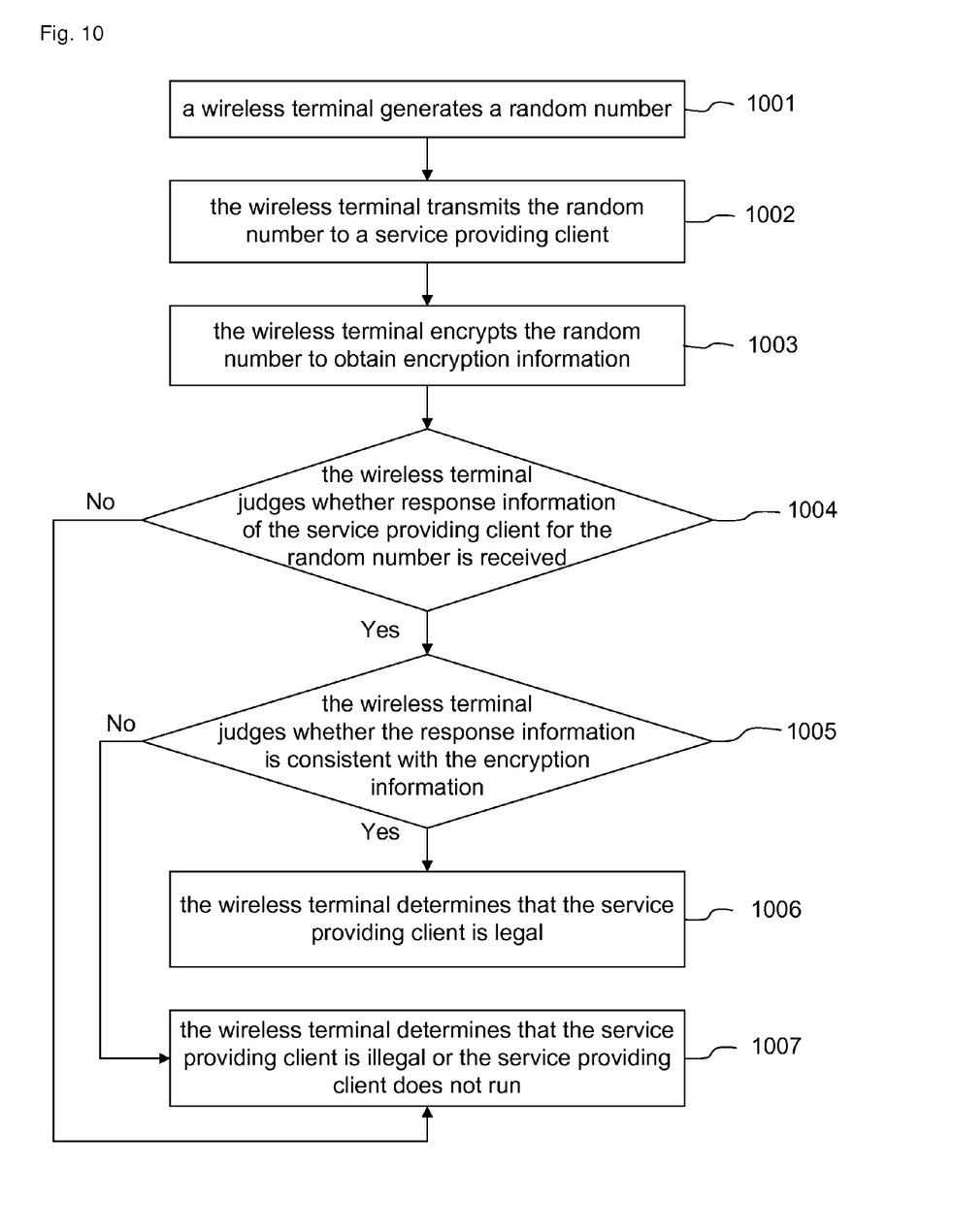
FIG. 10 shows a fourth flowchart of a method for implementing binding between a service providing client and a wireless client according to an embodiment of the disclosure.

FIG. 10 shows a fourth flowchart of a method for implementing binding between a service providing client and a wireless client according to an embodiment of the disclosure, and the method for implementing binding between a service providing client and a wireless client comprises the following steps.

Step 1001: a wireless terminal generates a random number as authentication information; in order to prevent the authentication information transmitted to a service providing client from being cracked easily, the wireless terminal can generate a random number as the authentication information to transmit to the service providing client; in order to increase cracking difficulty, it should be guaranteed that the random number generated each time is different and has relatively more digits, such as a random number with more than 8 digits.

Step 1002: the wireless terminal transmits the random number to the service providing client.

Step 1003: the wireless terminal encrypts the random number by using a second encryption algorithm to obtain encryption information; step 1002 and step 1003 above only represent that encryption and transmission are executed and do not represent the execution order.

Step 1004: the wireless terminal judges whether response information of the service providing client for the random number is received; if yes, step 1005 is to be executed; otherwise, step 1007 is to be executed.

Step 1005: the wireless terminal judges whether the response information is consistent with the encryption information; if yes, step 1006 is to be executed; otherwise, step 1007 is to be executed.

Step 1006: the wireless terminal determines that the service providing client is legal.

Step 1007: the wireless terminal determines that the service providing client is illegal or the service providing client does not run.

Besides, the service providing client connected with the wireless terminal probably transmits authentication information to the wireless terminal to authenticate whether the wireless terminal is legal; when receiving the authentication information transmitted by the service providing client, the wireless terminal can encrypt the authentication information by using a given encryption algorithm and then transmits the encrypted response information to the service providing client, so that the service providing client can authenticate whether the wireless terminal is legal through the response information of the wireless terminal; therefore, the method for implementing binding between a service providing client and a wireless terminal may further comprise: the step, when receiving authentication information transmitted by the service providing client, the wireless terminal encrypts the authentication information by using a first encryption algorithm to obtain response information; and the step the wireless terminal transmits the response information to the service providing client.

In the embodiment above, through an interactive authentication between a service providing client and a wireless terminal, it is judged whether the service providing client or the wireless terminal is legal; the service providing client only provides service to the legal wireless terminal which passes the authentication, similarly, the wireless terminal only provides service to the legal service providing client which passes the authentication; therefore, an operator can bind a customized wireless terminal and a customized service providing client to prevent the user who buys a product of the operator from using a product of other operators, thereby maintaining benefits of an operator and avoiding the chaotic condition in the prior art that any wireless terminals and service providing clients can be bound randomly.

The above is only the preferred embodiment of the disclosure; it should be noted that: for the ordinary technicians in the field of the technology, many improvements and modifications can be made without departing from the principle of the disclosure, and the improvements and modifications are deemed to be included in the protection scope of the disclosure.

The invention claimed is:

1. A service providing client, comprising:
a transmission module, which is configured to transmit authentication information to a wireless terminal;
a judgment module, which is configured to judge whether the wireless terminal is a legal binding object according to a response of the wireless terminal for the authentication information;
a processing module, which is configured to provide service to the wireless terminal if both the wireless terminal and the service providing client are legal, and restrict the service provided to the wireless terminal if the wireless terminal is an illegal binding object;
a random number generation module, which is configured to generate a random number as the authentication information;
a first encryption module, which is configured to encrypt the random number by using a first encryption algorithm to obtain encryption information;
wherein the judgment module comprises:
a first authentication unit, which is configured to judge whether response information of the wireless terminal for the random number is received;
a second authentication unit, which is configured to judge whether the response information is consistent with the encryption information if the response information is received;
a determination unit, which is configured to determine that the wireless terminal is a legal binding object if the response information is consistent with the encryption information, and determine that the wireless terminal is an illegal binding object if the response information is inconsistent with the encryption information or the wireless terminal does not respond;
a second encryption module, which is configured to encrypt authentication information by using a second encryption algorithm to obtain response information if the authentication information transmitted by the wireless terminal is received;
a feedback module, which is configured to transmit the response information to the wireless terminal; and
wherein the service providing client is located in a computing device which performs a communication function through the wireless terminal, and
wherein the transmission module, the judgement module, the processing module, the second encryption module, the random number generation module, the first encryption module and the feedback module are each the result of execution on a processor of software stored in a memory.

2. A wireless terminal, comprising:
a transmission module, which is configured to transmit authentication information to a service providing client;
a judgment module, which is configured to judge whether the service providing client is legal according to a response of the service providing client for the authentication information;
a processing module, which is configured to provide service to the service providing client if both the wireless terminal and the service providing client are legal, and provide no service if the service providing client is illegal;
a second encryption module, which is configured to encrypt authentication information by using a first encryption algorithm to obtain response information if authentication information transmitted by the service providing client is received; and
a feedback module, which is configured to transmit the response information to the service providing client,
wherein the service providing client is located in a computing device which performs a communication function through the wireless terminal;
a random number generation module, which is configured to generate a random number as the authentication information; and
a first encryption module, which is configured to encrypt the random number by using a second encryption algorithm to obtain encryption information;
wherein the judgment module comprises:
a first authentication unit, which is configured to judge whether response information of the service providing client for the random number is received;
a second authentication unit, which is configured to judge whether the response information is consistent with the encryption information if the response information is received; and
a determination unit, which is configured to determine that the service providing client is legal if the response information is consistent with the encryption information, and determine that the service providing client is illegal or the service providing client does not run if the response information is inconsistent with the encryption information or the response of the service providing client is not received, wherein the random number generation module and the first encryption module are each the result of execution on a processor of software stored in a memory wherein the transmission module, the judgment module, the processing module, the second encryption module, the random number generation module, the first encryption module and the feedback module are each the result of execution on a processor of software stored in a memory.

3. The wireless terminal according to claim 2, further comprising:

a timer, which is configured to start timing when being powered on and started;

wherein the transmission module is further configured to transmit the random number to the service providing client at a predefined time interval according to the timing of the timer;

the judgment module is further configured to determine that the service providing client is legal if response information of the service providing client for the random number is received within a predefined time and the response information is consistent with the encryption information, and determine that the service providing client is illegal or the service providing client does not run if the response information is received within the predefined time and the response information is inconsistent with the encryption information or the response of the service providing client is not received within the predefined time.

4. A method for implementing binding between a service providing client and a wireless terminal, comprising:

generating a random number as the authentication information by the service providing client; and encrypting, by the service providing client, the random number by using a first encryption algorithm to obtain encryption information;

transmitting authentication information to a wireless terminal by a service providing client;

judging, by the service providing client, whether response information of the wireless terminal for the random number is received;

judging whether the response information is consistent with the encryption information if the service providing client receives the response information; and determining, by the service providing client, that the wireless terminal is a legal binding object if the response information is consistent with the encryption information, and determining that the wireless terminal is an illegal binding object if the response information is inconsistent with the encryption information or the wireless terminal does not respond;

providing service to the wireless terminal by the service providing client if both the wireless terminal and the service providing client are legal, and restricting, by the service providing client, the service provided to the wireless terminal if the wireless terminal is an illegal binding object;

encrypting authentication information by using a second encryption algorithm to obtain response information if the service providing client receives the authentication information transmitted by the wireless terminal; and transmitting the response information to the wireless terminal by the service providing client, wherein the service providing client is located in a computing device which performs a communication function through the wireless terminal.

5. A method for implementing binding between a service providing client and a wireless terminal, comprising:

generating a random number as the authentication information by a wireless terminal; and encrypting the random number by using a second encryption algorithm by a wireless terminal to obtain encryption information;

transmitting authentication information to a service providing client by the wireless terminal;

judging, by the wireless terminal, whether response information of the service providing client for the random number is received;

judging whether the response information is consistent with the encryption information if the wireless terminal receives the response information; and determining, by the wireless terminal, that the service providing client is legal if the response information is consistent with the encryption information, and determining that the service providing client is illegal or the service providing client does not run if the response information is inconsistent with the encryption information or the response of the service providing client is not received, providing service to the service providing client by the wireless terminal if both the wireless terminal and the service providing client are legal, and providing no service if the service providing client is illegal;

encrypting authentication information by using a first encryption algorithm to obtain response information if authentication information transmitted by the service providing client is received; and transmitting the response information to the service providing client, wherein the service providing client is located in a computing device which performs a communication function through the wireless terminal.

* * * * *